2,996,385
VACUUM-ASSISTED METHOD OF TEMPERING CORN

Laurence A. Weinecke and Ordean L. Brekke, Peoria, Ill., assignors to the United States of America as represented by the Secretary of Agriculture
No Drawing. Filed Feb. 9, 1961, Ser. No. 88,231
1 Claim. (Cl. 99—103)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to an improved method of tempering stored whole corn kernels whereby the moisture content of the kernels is very rapidly increased from a level of about 14 percent to one of between 18 and 28 percent which is required for economically removing the hull and the oil-bearing germ of the corn in a commercial degerminating machine with the simultaneous recovery of large grits which are sold at a premium for subsequent processing into corn flakes or similar breakfast cereals.

It is well known that untempered stored whole corn contains only about 14 percent moisture and that such kernels are too brittle to avoid excessive breakage in a commercial degerminator. Therefore, great care is taken to temper the whole kernels before milling so as to avoid, on the one hand, large amounts of the non-premium smaller grits and especially the finely ground material which must go into animal feeds and, on the other hand, to avoid the penalized price when the grits, meal, and germ are overly hydrated and therefore involve increased drying costs to the final processor. It is customary, therefore, before degerminating stored corn to temper the overly dry kernels to a moisture content of between 18-28 percent (most commonly 20-24 percent) by treating them with water for about three or more hours. However, the above prior art method is necessarily restricted to a capacity-limiting batch process rather than a continuous process.

The principal object of this invention is a simple, trouble-free method of very quickly hydrating whole corn kernels to a desired moisture content between 18 and 28 percent based on the dry weight of the corn.

Another object is a process which can be selectively controlled and which is continuous rather than batch.

The above objects of the instant invention have been accomplished by our discovery that by subjecting the whole corn kernels to a partial vacuum while they are briefly immersed in a relatively shallow water bath, water penetration is so facilitated that the desired degree of hydration is obtained quickly with no risk of over-softening or gelatinizing the kernel. Although routine trials will readily indicate the exact degree of applied vacuum and immersion time required for obtaining a desired degree of hydration, the following example is presented to illustrate the practice of our invention. It is pointed out that merely applying and releasing a partial vacuum to the kernels before but not while they are being subjected to the water does not accelerate the imbibition thereof.

Also, it is obvious that for an applied partial vacuum to produce a uniform degree of water imbibition, the depth of corn to be treated preferably should be relatively shallow and in no event can closely approach a depth at which the hydrostatic pressure of a corresponding column of water would offset the vacuum which could be applied.

Example 1

100 lbs. of commercial elevator-stored dent corn having a moisture content of 14.1 percent was placed in a 54-gallon drum, the cover of which was adapted with fittings for applying vacuum and for the admission of water. A vacuum equivalent to 5 inches of Hg was applied, and then water sufficient to cover the corn was introduced and the partial vacuum maintained for 30 seconds before release. The corn kernels were removed and placed on a screen for drainage of free water, and were then found to contain 21 percent moisture. A control batch had been conventionally tempered for 3¼ hours to a 21 percent moisture content by treating with water. Both batches were run through a Beall degerminator with essentially similar results although the vacuum-treated corn gave a slightly higher yield of −4 +6 screen grits and observably fewer grits having attached germs or hulls.

Example 2

Two bushels of the same corn employed in Example 1 were placed in the drum of Example 1 and a vacuum equivalent to 5 inches of Hg was applied for 30 seconds. Water was added and the vacuum was released 30 seconds thereafter. The corn was then removed and transferred to a screen for drainage of free water. After 20 minutes the moisture content was found to be 20 percent, and no differences from the results of Example 1 were found when the tempered corn was run through the degerminator.

Example 3

50 g. of the same corn employed in Example 1 were placed in an 8 oz. bottle and a partial vacuum corresponding to 1 inch Hg was drawn for 1 minute. Water sufficient to cover the corn was then introduced and the partial vacuum held for another 30 seconds, after which it was released and the corn was allowed to soak for 1 minute. The corn was then removed from the water and towel-dried. It was then found to have a moisture content of 17.5 percent.

Having disclosed our invention, we claim:

In the method of increasing the moisture content of stored corn kernels from the level of about 14 percent to a level of between about 18 percent and about 28 percent by tempering the kernels in water, the improvement comprising the steps of applying to the water containing said kernels a vacuum of at least 1 inch Hg for about 30 seconds and then removing the kernels from the water.

No references cited.